(12) United States Patent
Wang et al.

(10) Patent No.: US 11,509,662 B2
(45) Date of Patent: Nov. 22, 2022

(54) METHOD, DEVICE AND COMPUTER PROGRAM PRODUCT FOR PROCESSING ACCESS MANAGEMENT RIGHTS

(71) Applicant: EMC IP Holding Company LLC, Hopkinton, MA (US)

(72) Inventors: Fei Wang, Chengdu (CN); Changxu Jiang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/189,598

(22) Filed: Mar. 2, 2021

(65) Prior Publication Data

US 2022/0103564 A1   Mar. 31, 2022

(30) Foreign Application Priority Data

Sep. 29, 2020   (CN) .......................... 202011057356.0

(51) Int. Cl.
| | |
|---|---|
| *G06F 15/173* | (2006.01) |
| *H04L 9/40* | (2022.01) |
| *H04L 67/06* | (2022.01) |
| *H04L 67/1097* | (2022.01) |

(52) U.S. Cl.
CPC .......... *H04L 63/102* (2013.01); *H04L 63/101* (2013.01); *H04L 63/20* (2013.01); *H04L 67/06* (2013.01); *H04L 67/1097* (2013.01)

(58) Field of Classification Search
CPC ..... H04L 63/102; H04L 63/101; H04L 63/20; H04L 67/06; H04L 67/1097

USPC ................................. 709/217, 219, 223, 225
See application file for complete search history.

(56) References Cited

U.S. PATENT DOCUMENTS

| | | | |
|---|---|---|---|
| 8,387,155 B2 | 2/2013 | Gregg et al. | |
| 8,578,483 B2 | 11/2013 | Seshadri et al. | |
| 10,216,957 B2 | 2/2019 | Jung et al. | |
| 10,958,659 B2 | 3/2021 | Eads et al. | |
| 2014/0279641 A1* | 9/2014 | Singh | G06Q 10/06 705/325 |
| 2018/0288060 A1* | 10/2018 | Jackson | H04L 63/102 |
| 2020/0136892 A1 | 4/2020 | Rao et al. | |
| 2020/0302074 A1* | 9/2020 | Little | G06F 21/602 |
| 2021/0084049 A1* | 3/2021 | Kartoun | H04L 63/102 |

* cited by examiner

*Primary Examiner* — Liang Che A Wang
(74) *Attorney, Agent, or Firm* — BainwoodHuang

(57) ABSTRACT

Techniques process an access management permission. Such techniques involve: receiving, from a client, a first request for obtaining an access management permission of a file. The techniques further involve: obtaining a current score of the file, wherein the current score indicates a probability of receiving, after the access management permission is assigned to the client, a second request conflicting with the first request. The techniques further involve: assigning the access management permission to the client if it is determined that the current score is greater than or equal to a threshold score. Such techniques alleviate the need to assign, to a client, the access management permission of a file with a high probability of an access conflict, thus enhancing the performance of the server as well as the user experience.

17 Claims, 5 Drawing Sheets

METHOD, DEVICE AND COMPUTER PROGRAM PRODUCT FOR PROCESSING ACCESS MANAGEMENT RIGHTS

CROSS-REFERENCE TO RELATED APPLICATION

This application claims priority to Chinese Patent Application No. CN202011057356.0, on file at the China National Intellectual Property Administration (CNIPA), having a filing date of Sep. 29, 2020, and having "METHOD, DEVICE AND COMPUTER PROGRAM PRODUCT FOR PROCESSING ACCESS MANAGEMENT RIGHTS" as a title, the contents and teachings of which are herein incorporated by reference in their entirety.

TECHNICAL FIELD

Embodiments of the present disclosure relate to the field of file management systems, and in particular, to a method, a device, and a computer program product for processing an access management permission.

BACKGROUND

A Network File System (NFS) is a system for sharing files through a platform. With the development of technology, the network file system can now support file sharing between different types of systems through a network, for example, allowing sharing of directories and files with others on the network. By using the NFS, users and programs can access files on a remote system like accessing local files.

The NFS takes a client/server architecture and consists of a client program and a server program. The server program provides other computers with accesses to the file system. When the NFS client program accesses the shared file system, files to be shared are obtained from the NFS server. However, there are still many problems to be solved in the process of using the NFS.

SUMMARY OF THE INVENTION

The embodiments of the present disclosure provide a method, a device, and a computer program product for processing an access management permission.

According to a first aspect of the present disclosure, a method for processing an access management permission is provided. The method includes: receiving, from a client, a first request for obtaining an access management permission of a file. The method further includes: obtaining a current score of the file, wherein the current score indicates a probability of receiving, after the access management permission is assigned to the client, a second request conflicting with the first request. The method further includes: assigning the access management permission to the client if it is determined that the current score is greater than or equal to a threshold score.

According to a second aspect of the present disclosure, an electronic device is provided. The electronic device includes at least one processor; and a memory coupled to the at least one processor and having instructions stored thereon, wherein the instructions, when being executed by the at least one processor, cause the device to perform actions including: receiving, from a client, a first request for obtaining an access management permission of a file; obtaining a current score of the file, wherein the current score indicates a probability of receiving, after the access management permission is assigned to the client, a second request conflicting with the first request; and assigning the access management permission to the client if it is determined that the current score is greater than or equal to a threshold score.

According to a third aspect of the present disclosure, a computer program product is provided, which is tangibly stored on a non-volatile computer-readable medium and includes machine-executable instructions, wherein the machine-executable instructions, when being executed, cause a machine to perform the steps of the method in the first aspect of the present disclosure.

BRIEF DESCRIPTION OF THE DRAWINGS

The above and other objectives, features, and advantages of the present disclosure will become more apparent by describing the example embodiments of the present disclosure in more detail in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Figure 1:
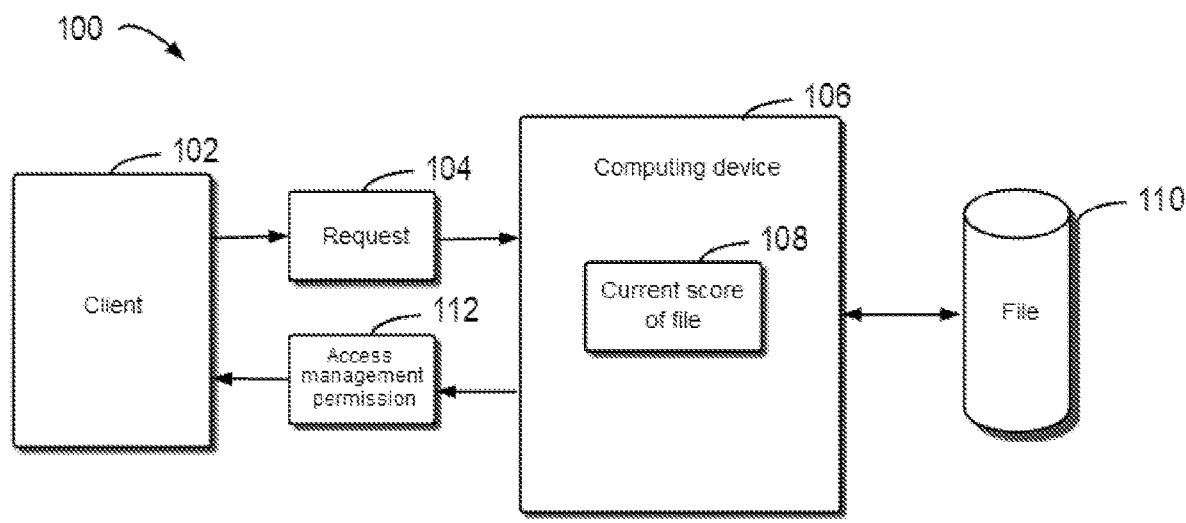
FIG. 1 illustrates a schematic diagram of example environment 100 in which the device and/or the method according to the embodiments of the present disclosure may be implemented.
Figure 2:
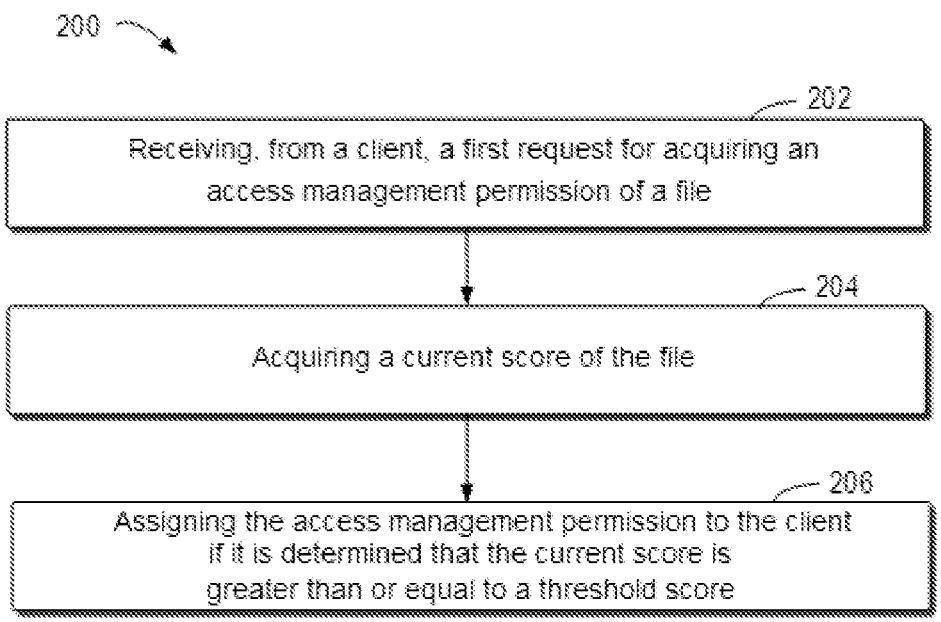
FIG. 2 illustrates a flowchart of method 200 for processing an access management permission according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, the embodiments of the present disclosure will be described in more detail with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, i.e., "including but not limited to." The term "based on" should be understood as "based at least in part on." The term "one embodiment" or "this embodiment" should be understood as "at least one embodiment." The terms "first," "second," etc., may refer to different or the same objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose limitation on the scope of the present disclosure in any way.

Conventionally, for file sharing, in order to reduce interactions between a computing device running an NFS and a client, the NFS can assign an access management permission (such as reading delegation and/or writing delegation) to the client, so that the client can cache data associated with a target file to reduce communications between the client and the server and reduce related overhead. However, when there is another access to the file that conflicts with the access by the client, the computing device will reclaim the access management permission. Then, a normal access mechanism is used to process the accesses to the file.

The aforementioned mechanism for assigning an access management permission improves the utilization of the cache, and reduces network traffics, thereby improving the performance of the client and the server. However, after the access management permission of the file is assigned, if there is a high probability of a conflicting access operation, the server needs to reclaim the access management permission (for example, reclaiming the reading delegation or writing delegation). The high time consumption of reclaiming the access management permission may result in failure to process a new request, thus degrading the performance of the server.

To improve the performance, when assigning the access management permission (e.g., the granting delegation) of the file to the client, the server must consider the possibility of a conflict with other access request. One approach is to implement machine learning for each file, so as to respectively analyze the access mode of each file to determine the probability that access requests for this file may conflict. However, when a large number (thousands or millions) of files are provided on the server, this implementation through a machine learning model takes a lot of time and resources.

In order to solve the above and other potential problems, the present disclosure provides a method for processing an access management permission. In this method, a computing device receives, from a client, a first request for obtaining an access management permission of a file. The computing device then obtains a current score of the file, wherein the current score indicates a probability of receiving, after the access management permission is assigned to the client, a second request conflicting with the first request. The computing device assigns the access management permission to the client if it is determined (or in response to determining) that the current score is greater than or equal to a threshold score. This approach avoids assigning, to a client, the access management permission of a file with a high probability of an access conflict, thereby improving the performance of the server and improving the user experience. In addition, the method is easy to implement and is scalable by considering the number of files and clients when assigning the management permission.

Embodiments according to the present disclosure are described in detail below with reference to FIGS. 1 to 5. FIG. 1 illustrates a schematic diagram of example environment 100 in which the device and/or the method according to the embodiments of the present disclosure may be implemented.

As shown in FIG. 1, example environment 100 includes client 102 and computing device 106. Client 102 is used to request for obtaining from computing device 106, access management permission 112, for example, the writing delegation or reading delegation, of file 110.

Client 102 may be implemented as any type of computing device including, but not limited to, a mobile phone (e.g., a smart phone), a laptop computer, a portable digital assistant (PDA), an electronic book (e-book) reader, a portable game console, a portable media player, a game console, a set-top box (STB), a smart television (TV), a personal computer, a laptop computer, a vehicle-mounted computer (e.g., a navigation unit), and the like.

Client 102 is used to generate request 104 for obtaining access management permission 112 of file 110, for example, a request for obtaining an opening delegation of file 110. In some embodiments, this request 104 includes an identification of file 110, and an identification for obtaining access management permission 112. Alternatively or additionally, this request 104 further includes a type of a target access operation to be performed by the user, for example, an operation mode, such as a writing operation mode and a reading operation mode. The above examples are only to describe the present disclosure, rather than specifically limiting the present disclosure.

Shown in FIG. 1 is example environment 100 including one client 102, which is an example only, rather than specifically limiting the present disclosure. Any number of clients can be included in example environment 100.

Computing device 106 is used to manage file 110 and can assign the access management permission of file 110 to client 102. After computing device 106 receives request 104 from client 102, when determining whether to assign access management permission 112 of file 110 to client 102, it also needs to use current score 108 of the file for further determination, wherein current score 108 of the file indicates a probability of receiving a conflicting request after access management permission 112 is assigned to client 102.

In some embodiments, after computing device 106 receives request 104 from client 102, it first determines, based on the type of the target access operation in request 104, whether there is another access operation on file 110 that conflicts with this type. If there is a conflicting access operation, access management permission 112 of file 110 will not be assigned to client 102. If there is no conflicting access operation, current score 108 of the file is used to determine whether to assign access management permission 112 to client 102. Alternatively or additionally, before making a determination using current score 108 of the file, it is also necessary to determine whether client 102 is qualified to obtain access management permission 112. When client 102 is qualified to obtain access management permission 112, current score 108 of the file is used for determination. If client 102 is not qualified to obtain access management permission 112, the access management permission will not be assigned to client 102.

If computing device 106 determines that access management permission 112 of file 110 can be assigned to client 102, computing device 106 transmits access management permission 112 to client 102. Then, client 102 uses the obtained access management permission 112 of file 110 to access file 110. For example, after client 102 obtains the writing delegation or reading delegation, it performs a reading operation or a writing operation on file 110. At this time, the consistency of data on the file at client 102 and data on the file managed by computing device 106 is guaranteed.

Computing device 106 includes, but is not limited to, a personal computer, a server computer, a handheld or laptop device, a mobile device (such as a mobile phone, a personal digital assistant (PDA), a media player, etc.), a multiprocessors system, a consumer electronic product, a small computer, a mainframe computer, a distributed computing environment including any of the above systems or devices, etc.

FIG. 1 shows one file 110 and the corresponding current score 108 of the file. It is by way of example only, rather than specifically limiting the present disclosure. Any suitable number of files and the current scores of files corresponding to those files may be managed within computing device 106.

The above approach avoids assigning, to a client, an access management permission of a file with a high probability of an access conflict, thereby improving the performance of the server and improving the user experience.

A schematic diagram of environment 100 in which the device and/or the method according to the embodiments of the present disclosure may be implemented has been described above in combination with FIG. 1. A flowchart of method 200 for processing an access management permission according to the embodiments of the present disclosure will be described below in combination with FIG. 2. Method 200 may be implemented in computing device 106 in FIG. 1 or any other suitable device.

At block 202, computing device 106 receives, from client 102, request 104 for obtaining an access management permission of file 110. For ease of description, request 104 is referred to as the first request. When accessing file 110, client 102 may send, to computing device 106, request 104 for obtaining access management permission 112 of file 110. For example, client 102 sends to computing device 106 an opening request for file 110, wherein the opening request includes identification information for obtaining the reading delegation or writing delegation.

In some embodiments, this request 104 includes at least the file identification, and the identification that is required to obtain access management permission 112 of the file. Alternatively or additionally, this request 104 also includes the type of a target access operation to be performed by client 102 on file 110, such as a writing operation mode and a reading operation mode. The above examples are only to describe the present disclosure, rather than specifically limiting the present disclosure.

At block 204, computing device 106 obtains current score 108 of the file, wherein current score 108 indicates a probability of receiving, after the access management permission is assigned to client 102, a second request conflicting with the first request.

In the process of assigning, by computing device 106, access management permission 112 of file 110 to client 102, it is also necessary to use current score 108 of the file to determine whether to assign access management permission 112. This current score 108 identifies a probability of a conflict of access requests for file 110. The process of calculating this score will be described below in combination with FIG. 3.

In some embodiments, computing device 106 obtains the file identification from the first request. Computing device 106 then uses the file identification of file 110 to search for current score 108 of the file from a predetermined mapping relationship between file identifications and scores. In this way, the current score of the file can be quickly determined, which improves the efficiency of obtaining the current score of the file.

In some embodiments, the first request also includes the type of the target access operation to be performed on file 110, such as the writing operation mode or the reading operation mode. After receiving the first request, computing device 106 will first determine whether there is an access operation on the file that conflicts with the type of the target access operation. For ease of description, this access operation is referred to as the first access operation. If it is determined that the first access operation does not exist, it indicates that there is no access operation that conflicts with the access operation to be performed by client 102 on file 110. Then, computing device 106 obtains current score 108 of the file. In this way, the access management permission can be provided only for a request that has no conflict, thereby improving the accuracy of assigning an access management permission.

Alternatively or additionally, after determining that there is no first access operation, it is also necessary to determine whether client 102 is qualified to obtain access management permission 112 to access file 110. If it is qualified to obtain access management permission 112 of file 110, current score 108 of the file will then be obtained. If it is not qualified, access management permission 112 is not assigned to client 102. For example, if a reverse channel between client 102 and computing device 106 cannot be established, client 102 is not qualified to obtain access management permission 112. The above examples are only to describe the present disclosure, rather than specifically limiting the present disclosure. Those skilled in the art may set criteria as needed under which client 102 is not qualified to obtain access management permission 112.

In some embodiments, if it is determined that there is the first access operation on file 110 that conflicts with the type of the target access operation, computing device 106 has to further determine whether there is assigned access management permission 112 for file 110. If determining that there is assigned access management permission 112, computing device 106 reclaims assigned access management permission 112. In this way, the assigned access management permission can be quickly reclaimed, and the efficiency of the first request to access the file can be improved. If there is no assigned access management permission or after the assigned access management permission is reclaimed, access management permission 112 is not assigned to client 102.

At block 206, if it is determined (or detected) that current score 108 is greater than or equal to a threshold score, computing device 106 assigns access management permission 112 to client 102. When access management permission 112 is assigned, access management permission 112 is assigned to it only when current score 108 of file 110 is greater than or equal to the threshold score. If it is less than the threshold score, access management permission 112 is not assigned to it.

In some embodiments, the threshold score is determined by computing device 106. Computing device 106 determines a threshold number of files of which access management permissions can be assigned in computing device 106. For example, computing device 106 can assign access management permissions for 50 files at most at the same time, so the threshold number is 50. Computing device 106 also obtains the number of a set of files of which access management permissions have been assigned and a set of scores corresponding to the set of files, wherein each score indicates a probability of a conflict between multiple requests for a corresponding file after the access management permission of the corresponding file is assigned to corresponding client 102.

For example, the number of the set of files of which the access management permissions have been assigned is N, where N is an integer greater than 0. Each file has a corresponding score $dq_n$, where $1 \leq n \leq N$. The current scores of the N files form an array $DQ = [dq_1, dq_2, dq_3, \ldots, dq_4, \ldots, dq_N]$, where $dq_n$ is the current score of the nth file. Then, computing device 106 calculates the threshold score using the threshold number, the number of the set of files, and the set of scores corresponding to the set of files. In this way, a reasonable threshold score can be quickly determined.

In some embodiments, in the process of calculating the threshold score using the threshold number, the number of the set of files, and the set of scores corresponding to the set of files, computing device 106 obtains a preset score of the file. For example, when the current score ranges from 0 to 100, the preset score may be set to 50, which is only to describe the present disclosure, rather than specifically limiting the present disclosure. The preset score can be set by the user to any suitable value.

Then, computing device 106 determines whether the number of the set of files is greater than or equal to the threshold number. If the number of the set of files is greater than or equal to the threshold number, it indicates that the number of files of which the access management permissions have been assigned is greater than the number of files of which the access management permissions can be assigned at the same time. At this time, computing device 106 sorts the set of scores in order from large to small. Computing device 106 then determines a first score associated with the threshold number from the sorted set of scores. For example, the number of files of which the access management permissions have been assigned is 100 and computing device 106 can assign access management permissions to 50 files at the same time. Then, the scores of the 100 files are sorted in order from large to small, and then the score of the 50th file is used as the first score.

Computing device 106 determines the threshold score based on the first score and the preset score. In one embodiment, computing device 106 takes the maximum value of the first score and the preset score as the threshold score. In another embodiment, those skilled in the art can use the first score and the preset score to determine the threshold score in any suitable manner. The above examples are only to describe the present disclosure, rather than specifically limiting the present disclosure.

If determining that the number is less than the threshold number, computing device 106 determines the preset score as the threshold score. In this way, the threshold score can be determined more reasonably, so as to select more appropriate files for assigning access management permissions.

In some embodiments, when computing device 106 receives an instruction from client 102 to terminate access management permission 110, assigning of access management permission 110 is terminated. Computing device 106 then updates the current score of the file using a first access duration, a first reclaiming indication value, and a first conflict indication value that are associated with the first request, wherein the first access duration indicates a length of time during which the access management permission is assigned to the first request; the first reclaiming indication value indicates an assigning and reclaiming status of the access management permission; and the first conflict indication value indicates, when the corresponding first request is executed, whether there is a second request that conflicts with the first request. In this way, the current score of the file can be quickly updated to make the current score of the file more accurate. The updating process can be performed using the method of determining the current score of the file described below in FIG. 3.

The above approach avoids assigning, to a client, an access management permission of a file with a high probability of an access conflict, thereby improving the performance of the server and improving the user experience.

Figure 3:
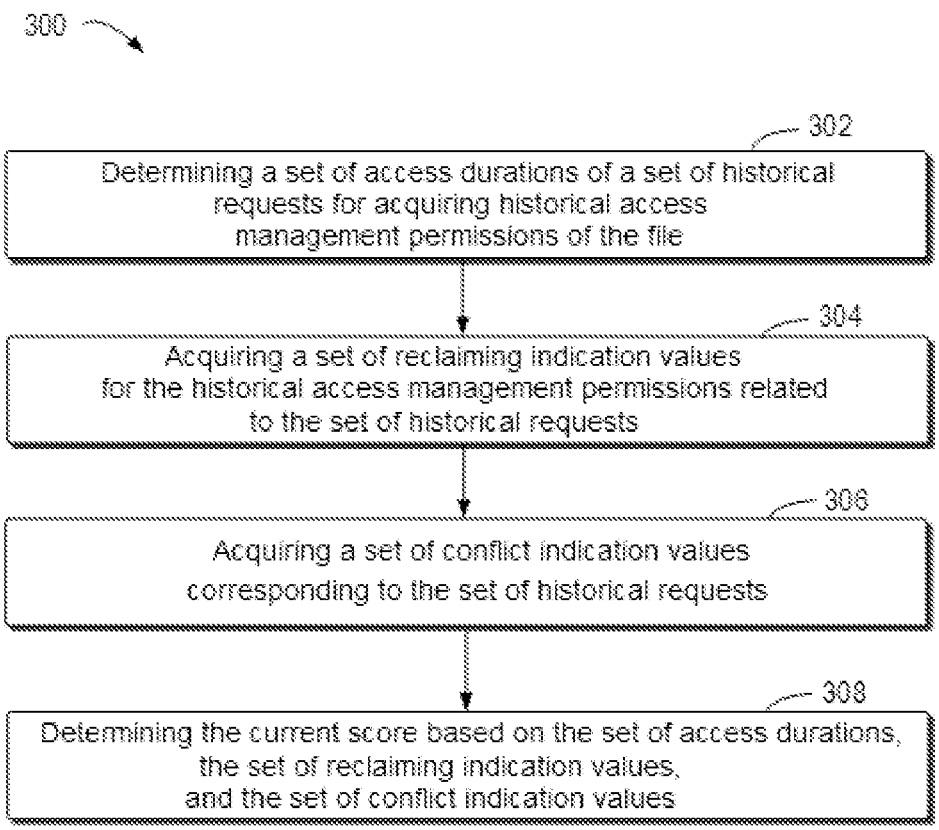
FIG. 3 illustrates a flowchart of method 300 for determining a current score of a file according to an embodiment of the present disclosure.

Method 200 for processing an access management permission according to the embodiments of the present disclosure has been described above in combination with FIG. 2. The method for determining a current score of a file will be described below in combination with FIG. 3. FIG. 3 illustrates a flowchart of method 300 for determining a current score of a file according to an embodiment of the present disclosure. Method 300 in FIG. 3 may be implemented by computing device 106 in FIG. 1 or any other suitable device.

At block 302, computing device 106 determines a set of access durations of a set of historical requests for obtaining historical access management permissions of file 110, wherein each access duration indicates a length of time during which the historical access management permission was assigned to the corresponding historical request. Computing device 106 obtains information related to a set of historical access requests for file 110 from a storage means (or circuit) or a memory. For example, information related to the most recent M requests for obtaining the access management permissions of file 110, where M is an integer greater than 0.

In some embodiments, computing device 106 has N files of which the access management permissions have been assigned, where N is an integer greater than 0, and each file has a corresponding score. File 110 is the nth file among the N files, $1 \leq n \leq N$. For the nth file, after obtaining the information related to the Mth request for obtaining the access management permission of the file, the score of the file may be recalculated from the information related to the most recent M requests for obtaining the access management permissions of the file.

The current score of the nth file among the N files is $dq_n$. The initial value of the current score $dq_n$ is set to 100. The current score of the file is recalculated after each operation of the request for obtaining the access management permission of the file. After obtaining the information about the Mth access request, the information related to the most recent M access requests can be used to recalculate the current score $dq_n$ of the file.

The set of access durations of the most recent M requests for obtaining the access management permissions of the nth file is $D_n=[d_1, d_2, d_3, \ldots, d_4, \ldots, d_M]$, where M is an integer greater than 0, and $d_m$ is the access duration of the mth request $1 \leq m \leq M$. In one example, the unit of duration is minute. The value of $d_m$ ranges from 0 to 100. If the duration is longer than 100 minutes, it will be set to $d_m=100$. When no access management permission is assigned to the request, $d_m=0$, which means that the request is rejected. The above examples are only to describe the present disclosure, rather than specifically limiting the present disclosure.

At block 304, computing device 106 obtains a set of reclaiming indication values for the historical access management permissions related to the set of historical requests, wherein each reclaiming indication value indicates the assigning and reclaiming status of the corresponding historical access management permission.

In some embodiments, the set of reclaiming status indication values of the most recent M requests for obtaining the access management permissions of the nth file is $R_n=[r_1, r_2, r_3, \ldots, r_4, \ldots, r_M]$, where $r_m$ represents the assigning and reclaiming status of the access management permission for the mth request, $1 \leq m \leq M$. If $r_m$ is 1, it means that during the period when the access management permission was assigned for access, no reclamation of the access management permission occurred due to an access conflict. If $r_m$ is $-1$, it means that during the period when the access management permission was assigned for access, a reclamation of the access management permission occurred due to an access conflict. If $r_m$ is 0, it means that the request was rejected and the access management permission was not assigned. The above examples are only to describe the present disclosure, rather than specifically limiting the present disclosure.

At block 306, computing device 106 obtains a set of conflict indication values corresponding to the set of historical requests, wherein each conflict indication value indicates, when a corresponding first historical request was executed, whether there was a second historical request that conflicted with the first historical request.

In some embodiments, the set of conflict indication values in the most recent M requests for obtaining the access management permissions to the nth file is $C=[c_1, c_2, c_3, \ldots, c_4, \ldots, c_M]$, where $c_m$ represents whether there was a conflicting request when the mth request was executed, $1 \leq m \leq M$. If $c_m$ is 0, it means that no conflict occurred during the period when the access management permission was assigned for access; otherwise, if it is 1, it means that a conflict occurred during the period when the access management permission was assigned for access.

At block 308, computing device 106 determines the current score based on the set of access durations, the set of reclaiming indication values, and the set of conflict indication values.

In some embodiments, the following formula (1) is used to calculate an adjusted value $\overline{dq}_n$ of the current score of the nth file using data related to the most recent M requests for obtaining access management permissions of the nth file:

$$\overline{dq}_n = dq_n \cdot \frac{\sum_{m=1}^{M} \omega_m d'_m}{\sum_{m=1}^{M} \omega_m d_m} \quad (1)$$

where $dq_n$ represents, for the nth file of the N files of which the access management permissions have been assigned, the current score of this file that is calculated prior to the Mth request for obtaining the access management permission to this file; $\omega_m$ represents the weight of the mth request for obtaining the access management permission among the most recent M requests for obtaining the access management permissions of the nth file, $1 \leq m \leq M$; and $\overline{dq}_n$ represents upward rounding of the calculated value, and $d_m$ represents the access duration of the mth request; $d_m'$ represents the mth data item in the adjusted set $D_n'=[d_1', d_2', d_3', \ldots, d_4', \ldots, d_M']$ corresponding to $D_n$, and it represents the adjusted access duration of the mth request, with $d_m'$ ranging from 0 to 100. In one example, the unit of $d_m'$ is minute. The above examples are only to describe the present disclosure, rather than specifically limiting the present disclosure.

In an example, each item in $D_n'=[d_1', d_2', d_3', \ldots, d_4', \ldots, d_M']$ is determined in the following way. For any value m in [1, M], if $r_m=0$ and $c_m=0$, then $d_m'=50$. If $r_m=-1$, when $d_m>50$, $d_m'=\min(100, d_m+20)$, where min( ) means to take the minimum value; otherwise, $d_m'=\max(0, d_m-20)$, where max( ) means to take the maximum value. When $r_m=1$, $d_m'=d_m$. In another example, $d_m'$ can be set to any suitable value as required. The above examples are only for description, rather than specifically limiting the present disclosure.

After obtaining $\overline{dq}_n$, the recalculated value for the nth file is $dq_n=\min(\overline{dq}_n, 100)$, where min( ) means to take the minimum value.

Through the above method, the current score of the file can be quickly obtained, and the current score can be made more accurate and effective.

In some embodiments, when computing device 106 receives the Mth request for obtaining the access management permission of the nth file, it sets $[d_M, r_M, c_M]=[0,0,0]$. When the result of the Mth access request is that no access management permission is assigned, $r_M$ is updated to 0; if after the Mth access request, the access management permission is assigned to the client and is not reclaimed due to a conflict, then $r_M$ is updated to 1; and if after the Mth access request, the access management permission is assigned and then the access right is reclaimed due to a conflict, $r_{M\ is}$ updated to $-1$. If it is determined that there is an access operation that conflicts with the type of the target access operation in the request, $c_{M\ is}$ updated to 1; and if the access management permission is terminated or reclaimed, $d_M$ is updated with the corresponding duration.

In some embodiments, the information that is related to the M access management requests and used to calculate the current score of the nth file, and the previously calculated scores may be stored in the storage means of computing device 106, so as to recalculate the current score of the nth file every time the score is obtained.

In some embodiments, the current score of the nth file may be calculated after the operation of the Mth request for obtaining the access management permission of the nth file is completed, so that the current score of the nth file may be obtained directly from the file identification when obtaining the current score. In one example, if the Mth access request obtains the access management permission and has not been reclaimed, the current score of the file is recalculated when the user does not need the access management permission or the access management permission is terminated by the server. In another example, the current score of the file is recalculated when the nth file has not obtained the access management permission. In the above manner, a more accurate current score can be obtained.

Figure 4:
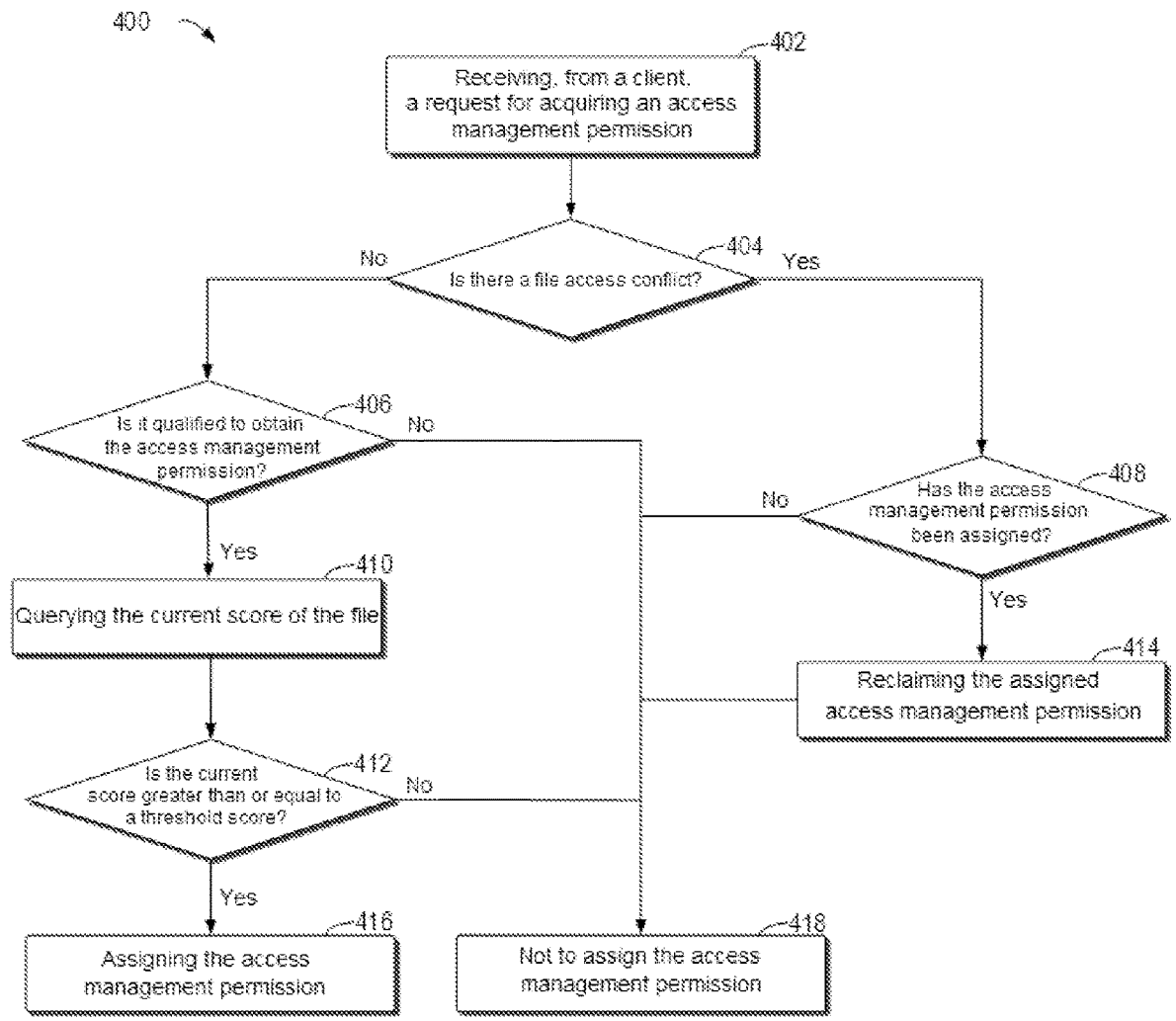
FIG. 4 illustrates a flowchart of example 400 for assigning an access management permission according to an embodiment of the present disclosure.

Method 300 for determining the current score of a file according to the embodiments of the present disclosure has been described above in combination with FIG. 3. The flowchart of an example for assigning an access management permission will be described below in combination with FIG. 4. FIG. 4 illustrates a flowchart of example 400 for assigning an access management permission according to an embodiment of the present disclosure. Method 400 in FIG. 4 may be implemented by computing device 106 in FIG. 1 or any other suitable device.

At block 402, computing device 106 receives, from client 102, request 104 for obtaining access management permission 112 of file 110. Request 104 includes at least the identification of the file to be accessed, the identification for obtaining access management permission 112, and the type of the target access operation. For example, an opening request for file 110 includes at least the identification for obtaining file 110, the identification for obtaining the writing delegation or reading delegation, and the operation mode, such as the writing operation mode or reading operation mode.

At block 404, computing device 106 determines whether there is a file access conflict. In one example, it is determined whether there is another access action that conflicts with the type of the target access action in this request. This another access action comes from another access request for the same file.

If there is a conflict, at block 408, computing device 106 determines whether access management permission 112 of the file has been assigned, for example, determines whether the writing delegation or reading delegation has been assigned to the another access request. If access management permission 112 has been assigned, at block 414, computing device 106 needs to reclaim the assigned access management permission of file 110. If the access management permissions has not been assigned or the assigned access management permissions has been reclaimed, at block 418, computing device 106 determines not to assign access management permission 112.

If it is determined at block 404 that there is no file access conflict, at block 406, computing device 106 determines whether client 102 is qualified to obtain access management permission 112. If client 102 is qualified to obtain access management permission 112, at block 410, computing device 410 queries the current score of file 110 based on the identification of the file. At block 412, computing device 106 determines whether the current score is greater than a threshold score. If the current score of file 110 is greater than the threshold score, at block 416, computing device 106 assigns, to client 102, access management permission 112 of file 110, such as the reading delegation or writing delegation.

If client 102 is not qualified to obtain access management permission 112 or the current score of file 110 is less than the threshold score, at block 418, access management permission 112 is not assigned.

This approach avoids assigning, to a client, the access management permission of a file with a high probability of an access conflict, thereby improving the performance of the server and improving the user experience.

Figure 5:
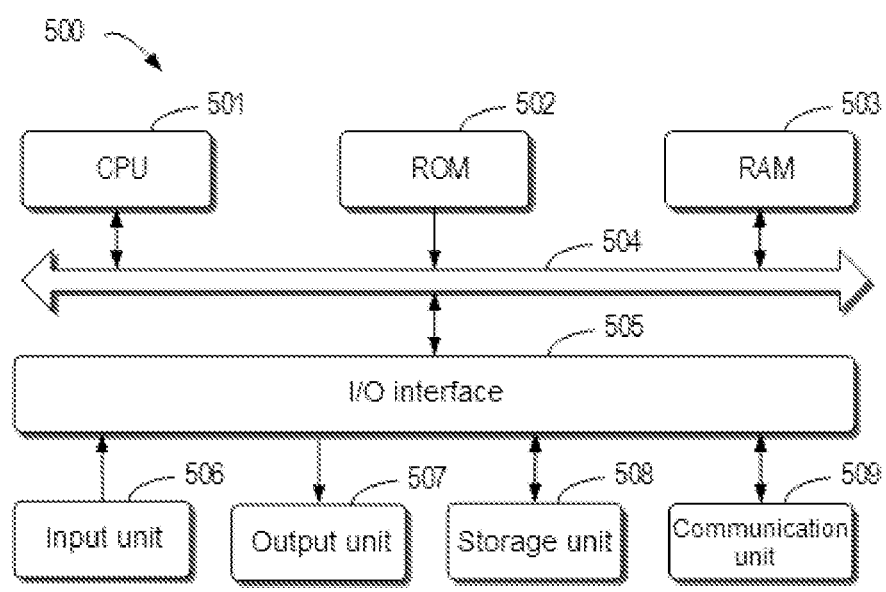
FIG. 5 illustrates a schematic block diagram of example device 500 applicable to implement the embodiments of the content of the present disclosure.

FIG. 5 illustrates a schematic block diagram of example device 500 that can be used to implement the embodiments of the content of the present disclosure. For example, client 102 and computing device 106 as shown in FIG. 1 may be implemented by device 500. As shown in the drawing, device 500 includes central processing unit CPU 501 that may perform various appropriate actions and processing according to computer program instructions stored in read-only memory ROM 502 or computer program instructions loaded from storage unit 508 into random access memory RAM 503. In RAM 503, various programs and data required for the operation of storage device 500 may also be stored. CPU 501, ROM 502, and RAM 503 are connected to each other through bus 504. Input/output I/O interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, for example, methods 200, 300, and 400, can be performed by processing unit 501. For example, in some embodiments, methods 200, 300, and 400 may be implemented as a computer software program that is tangibly included in a machine-readable medium such as storage unit 508. In some embodiments, part or all of the computer program may be loaded and/or mounted to device 500 via ROM 502 and/or communication unit 509. One or more actions of methods 200, 300, and 400 described above may be performed when the computer program is loaded into RAM 503 and executed by CPU 501.

The embodiments of the present disclosure relate to a method, an electronic device, and/or a computer program product. The embodiments of the present disclosure may further include a computer-readable storage medium on which computer-readable program instructions for performing various aspects of the present disclosure are loaded.

The computer-readable storage medium may be a tangible device that can hold and store instructions used by an instruction execution device. The computer-readable storage medium may be, for example, but is not limited to, an electric storage device, a magnetic storage device, an optical storage device, an electromagnetic storage device, a semiconductor storage device, or any suitable combination of the foregoing. More specific examples, as a non-exhaustive list, of computer-readable storage media include: a portable computer disk, a hard disk, a random access memory RAM, a read-only memory ROM, an erasable programmable read-only memory EPROM or a flash memory, a static random access memory SRAM, a portable compact disc read-only memory CD-ROM, a digital versatile disc DVD, a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, Instruction Set Architecture ISA instructions, machine instructions, machine-related instructions, microcode, firmware instructions, status setting data, or source code or object code written in any combination of one or more programming languages, including object-oriented programming languages, such as Smalltalk and C++, as well as conventional procedural programming languages, such as "C" language or similar programming languages. The Computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network LAN or a wide area network WAN, or can be connected to an external computer, for example, connected through the Internet using an Internet service provider. In some embodiments, an electronic circuit, such as a programmable logic circuit, a field programmable gate array FPGA, or a programmable logic array PLA, can be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus/system, and the computer program product according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing apparatus, or a further device, so that a series of operating steps can be performed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possible implementations of the systems, methods and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the various embodiments disclosed herein.

The invention claimed is:

1. A method for processing an access management permission, comprising:
   receiving, from a client, a first request for obtaining an access management permission of a file;
   obtaining a current score of the file, wherein the current score indicates a probability of receiving, after the access management permission is assigned to the client, a second request conflicting with the first request; and
   assigning the access management permission to the client- in response to determining that the current score is greater than or equal to a threshold score;
   wherein the first request includes a type of a target access operation to be performed on the file;
   wherein the method further comprises:
   determining whether there is an assigned access management permission of the file, in response to determining that there is a first access operation on the file that conflicts with the type of the target access operation; and
   reclaiming the assigned access management permission in response to determining that there is an assigned access management permission.

2. The method according to claim 1, wherein the first request includes an identification of the file, wherein obtaining the current score comprises:
   obtaining the current score based on the identification of the file and a predetermined mapping relationship between file identifications and scores of files associated with the file identifications.

3. The method according to claim 1, wherein obtaining the current score comprises:
determining a set of access durations of a set of historical requests for obtaining historical access management permissions of the file, wherein each access duration indicates a length of time during which the historical access management permission was assigned to a corresponding historical request;
obtaining a set of reclaiming indication values for the historical access management permissions related to the set of historical requests, wherein each reclaiming indication value indicates the assigning and reclaiming status of the corresponding historical access management permission;
obtaining a set of conflict indication values corresponding to the set of historical requests, wherein each conflict indication value indicates, when a corresponding first historical request was executed, whether there was a second historical request that conflicted with the first historical request; and
determining the current score based on the set of access durations, the set of reclaiming indication values, and the set of conflict indication values.

4. The method according to claim 1,
wherein obtaining the current score of the file further comprises:
obtaining the current score of the file in response to determining that there is no first access operation on the file that conflicts with the type of the target access operation.

5. The method according to claim 1, further comprising determining the threshold score,
wherein determining the threshold score comprises:
determining a threshold number of files of which access management permissions can be assigned;
obtaining a number of a set of files of which access management permissions have been assigned and a set of scores corresponding to the set of files, wherein each score in the set of scores indicates a probability of a conflict between multiple requests for a corresponding file after the access management permission of the corresponding file is assigned to a corresponding client; and
calculating the threshold score based on the threshold number, the number, and the set of scores.

6. The method according to claim 5, wherein calculating the threshold score comprises:
obtaining a preset score for the file;
in response to determining that the number is greater than or equal to the threshold number,
sorting the set of scores in order from large to small,
determining a first score associated with the threshold number from the sorted set of scores, and
determining the threshold score based on the first score and the preset score; and
determining the preset score as the threshold score in response to determining that the number is less than the threshold number.

7. The method according to claim 1, further comprising:
updating the current score of the file based on a first access duration, a first reclaiming indication value, and a first conflict indication value that are associated with the first request in response to determining that an instruction to terminate the access management permission is received from the client, wherein the first access duration indicates a length of time during which the access management permission is assigned to the first request; the first reclaiming indication value indicates the assigning and reclaiming status of the access management permission; and the first conflict indication value indicates, when the corresponding first request is executed, whether there is the second request that conflicts with the first request.

8. The method according to claim 1, wherein receiving the first request includes:
receiving, as the first request, a request to access a shared file within a Network File System (NFS); and
wherein the second request indicates a request to access the shared file.

9. The method according to claim 1, further comprising:
in response to receiving the first request, confirming that the access management permission is not currently assigned to another client; and
confirming, prior to obtaining the current score of the file, that the client has authority to obtain the access management permission of the file.

10. An electronic device, comprising:
at least one processor; and
a memory coupled to the at least one processor and having instructions stored thereon, wherein the instructions, when being executed by the at least one processor, cause the device to perform actions comprising:
receiving, from a client, a first request for obtaining an access management permission of a file;
obtaining a current score of the file, wherein the current score indicates a probability of receiving, after the access management permission is assigned to the client, a second request conflicting with the first request; and
assigning the access management permission to the client in response to determining that the current score is greater than or equal to a threshold score;
wherein the first request includes a type of a target access operation to be performed on the file;
wherein the actions further comprise:
determining whether there is an assigned access management permission of the file, in response to determining that there is a first access operation on the file that conflicts with the type of the target access operation; and
reclaiming the assigned access management permission in response to determining that there is an assigned access management permission.

11. The electronic device according to claim 10, wherein the first request includes an identification of the file, wherein obtaining the current score comprises:
obtaining the current score based on the identification of the file and a predetermined mapping relationship between file identifications and scores of files associated with the file identifications.

12. The electronic device according to claim 10, wherein obtaining the current score comprises:
determining a set of access durations of a set of historical requests for obtaining historical access management permissions of the file, wherein each access duration indicates a length of time during which the historical access management permission was assigned to a corresponding historical request;
obtaining a set of reclaiming indication values for the historical access management permissions related to the set of historical requests, wherein each reclaiming indication value indicates the assigning and reclaiming status of the corresponding historical access management permissions;

obtaining a set of conflict indication values corresponding to the set of historical requests, wherein each conflict indication value indicates, when a corresponding first historical request was executed, whether there was a second historical request that conflicted with the first historical request; and determining the current score based on the set of access durations, the set of reclaiming indication values, and the set of conflict indication values.

13. The electronic device according to claim 10, wherein obtaining the current score of the file further comprises:

obtaining the current score of the file in response to determining that there is no first access operation on the file that conflicts with the type of the target access operation.

14. The electronic device according to claim 10, the actions further comprising determining the threshold score, wherein determining the threshold score comprises:

determining a threshold number of files of which access management permissions can be assigned;

obtaining a number of a set of files of which access management permissions have been assigned and a set of scores corresponding to the set of files, wherein each score in the set of scores indicates a probability of a conflict between multiple requests for a corresponding file after the access management permission of the corresponding file is assigned to a corresponding client; and calculating the threshold score based on the threshold number, the number, and the set of scores.

15. The electronic device according to claim 14, wherein calculating the threshold score comprises:

obtaining a preset score for the file;

in response to determining that the number is greater than or equal to the threshold number, sorting the set of scores in order from large to small, determining a first score associated with the threshold number from the sorted set of scores, and determining the threshold score based on the first score and the preset score; and determining the preset score as the threshold score in response to determining that the number is less than the threshold number.

16. The electronic device according to claim 10, wherein the actions further comprise:

updating the current score of the file based on a first access duration, a first reclaiming indication value, and a first conflict indication value that are associated with the first request in response to determining that an instruction to terminate the access management permission is received from the client, wherein the first access duration indicates a length of time during which the access management permission is assigned to the first request; the first reclaiming indication value indicates the assigning and reclaiming status of the access management permission; and the first conflict indication value indicates, when the corresponding first request is executed, whether there is the second request that conflicts with the first request.

17. A computer program product having a non-transitory computer readable medium which stores a set of instructions to process an access management permission; the set of instructions, when carried out by computerized circuitry, causing the computerized circuitry to perform a method of:

receiving, from a client, a first request for obtaining an access management permission of a file;

obtaining a current score of the file, wherein the current score indicates a probability of receiving, after the access management permission is assigned to the client, a second request conflicting with the first request; and assigning the access management permission to the client in response to determining that the current score is greater than or equal to a threshold score;

wherein the first request includes a type of a target access operation to be performed on the file;

wherein the method further comprises:

determining whether there is an assigned access management permission of the file, in response to determining that there is a first access operation on the file that conflicts with the type of the target access operation; and reclaiming the assigned access management permission in response to determining that there is an assigned access management permission.

* * * * *